(12) United States Patent
Taylor et al.

US009189387B1

(10) Patent No.: US 9,189,387 B1
(45) Date of Patent: Nov. 17, 2015

(54) COMBINED MEMORY AND STORAGE TIERING

(71) Applicant: EMC Corporation, Hopkinton, MA (US)

(72) Inventors: Kenneth J. Taylor, Franklin, MA (US); Roy E. Clark, Hopkinton, MA (US); Amnon Naamad, Brookline, MA (US); Yaron Dar, Sudbury, MA (US)

(73) Assignee: EMC Corporation, Hopkinton, MA (US)

( * ) Notice: Subject to any disclaimer, the term of this patent is extended or adjusted under 35 U.S.C. 154(b) by 283 days.

(21) Appl. No.: 13/925,143

(22) Filed: Jun. 24, 2013

(51) Int. Cl.
 *G06F 12/00* (2006.01)
 *G06F 12/02* (2006.01)
 *G06F 3/06* (2006.01)

(52) U.S. Cl.
 CPC .......... *G06F 12/0246* (2013.01); *G06F 3/0689* (2013.01)

(58) Field of Classification Search
 CPC ..................... G06F 12/0246; G06F 3/0689
 See application file for complete search history.

(56) References Cited

U.S. PATENT DOCUMENTS

2014/0208017 A1* 7/2014 Benhase et al. ............... 711/113

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — John Lane
(74) *Attorney, Agent, or Firm* — Ryan, Mason & Lewis, LLP

(57) ABSTRACT

Techniques for combined memory and storage tiering. For example, in one example, a method for managing placement of data in a data memory and storage system environment including at least one host computing device and at least one storage array includes the following steps. A memory and storage tier architecture is maintained across the data memory and storage system environment including one or more tiers resident on the host computing device and one or more tiers resident on the storage array. A user is enabled to: (i) specify on which of the one or more tiers resident on the host computing device and the one or more tiers resident on the storage array to store data associated with the execution of an application program; and/or (ii) specify a level of service by which the system automatically manages which of the one or more tiers resident on the host computing device and the one or more tiers resident on the storage array to store data associated with the execution of the application program.

20 Claims, 8 Drawing Sheets

US 9,189,387 B1

COMBINED MEMORY AND STORAGE TIERING

FIELD

The field relates generally to data storage system environments, and more particularly to techniques for combined memory and storage tiering in a data storage system environment.

BACKGROUND

A data storage system environment typically includes one or more host computing devices (hosts) in communication with one or more storage arrays. A host typically executes an application program (e.g., a database application) which requires data associated with the application to be stored locally (i.e., on the host), remotely (i.e., on one of the storage arrays), or stored both locally and remotely. The host typically includes memory devices that provide both volatile random access memory capacity (e.g., Dynamic RAM or DRAM devices) and non-volatile random access memory capacity (e.g., flash memory devices). The storage array typically includes storage devices that provide non-volatile random access storage capacity (e.g., flash memory devices) and non-volatile large storage capacity (e.g., hard disk drives (HDDs) and tape drives). In general, random access memory is used to satisfy high throughput and/or bandwidth requirements of a given application program while the hard disk and tape drives are used to satisfy capacity requirements.

One major consideration for an application program developer is to determine on which type of memory or storage device to store data associated with the application program. Data storage systems typically use "tiering" techniques that attempt to control on what storage level, or tier, data associated with an application program is stored. However, since each application program being developed has its own throughput, bandwidth and capacity requirements, no one memory and storage tiering solution will accommodate every application program.

A need therefore exists for techniques for providing flexibility in determining how and where to store data in a data memory and storage system environment.

SUMMARY

Embodiments of the invention provide techniques for combined memory and storage tiering in a data memory and storage system environment.

For example, in one embodiment, a method for managing placement of data in a data memory and storage system environment comprising at least one host computing device and at least one storage array comprises the following steps. A memory and storage tier architecture is maintained across the data memory and storage system environment comprising one or more tiers resident on the host computing device and one or more tiers resident on the storage array. A user is enabled to at least one of: (i) specify on which of the one or more tiers resident on the host computing device and the one or more tiers resident on the storage array to store data associated with the execution of an application program; and (ii) specify a level of service by which the system automatically manages which of the one or more tiers resident on the host computing device and the one or more tiers resident on the storage array to store data associated with the execution of the application program.

In another embodiment, a method for managing placement of data in a host computing device comprises the following steps. A memory tier architecture is maintained comprising one or more memory tiers resident on the host computing device. A user is enabled to at least one of: (i) specify on which of the one or more memory tiers resident on the host computing device to store data associated with the execution of an application program; and (ii) specify a level of service by which the device automatically manages which of the one or more memory tiers resident on the host computing device to store data associated with the execution of the application program.

In yet another embodiment, a computer program product is provided which comprises a processor-readable storage medium having encoded therein executable code of one or more software programs. The one or more software programs when executed by a processor implement steps of at least one of the above-described methods.

In a further embodiment, a system comprises a processor configured to perform steps of at least one of the above-described methods.

Advantageously, embodiments described herein provide an on-boarding mechanism for application providers to enable both memory tiering, and combined memory/storage local/storage area network tiering for their information. The combined memory and storage tiering provides an end-to-end tiering solution for a data memory and storage system environment. In addition, embodiments provide methods for persisting tiered memory and having the tiered memory participate as an administered and protected resource along with other tiered storage assets.

These and other features and advantages of the present invention will become more readily apparent from the accompanying drawings and the following detailed description.

DETAILED DESCRIPTION

Embodiments of the present invention will be described herein with reference to exemplary computing systems, data memory and storage systems, and associated servers, computers, memory devices, storage devices and other processing devices. It is to be appreciated, however, that embodiments of the invention are not restricted to use with the particular illustrative system and device configurations shown. Moreover, the phrases "computing system," "processing platform," "data memory and storage system," and "data memory and storage system environment" as used herein with respect to various embodiments are intended to be broadly construed, so as to encompass, for example, private or public cloud computing or storage systems, or parts thereof, as well as other types of systems comprising distributed virtual infrastructure and those not comprising virtual infrastructure. However, a given embodiment may more generally comprise any arrangement of one or more processing devices.

As illustratively used herein, the term "memory" refers to primary memory such as, by way of example, dynamic random access memory or memory mapped files. Such primary memory is accessed by an application program using memory access programming semantics. Any reads or writes to underlying devices is done by the operating system, not the application program. Further, as illustratively used herein, the term "storage" refers to any resource that is accessed by the application program via input/output device semantics such as read and write systems calls. In certain instances, the same physical hardware device could be accessed by the application program as either memory or as storage for purposes of embodiments of the invention.

Figure 1:
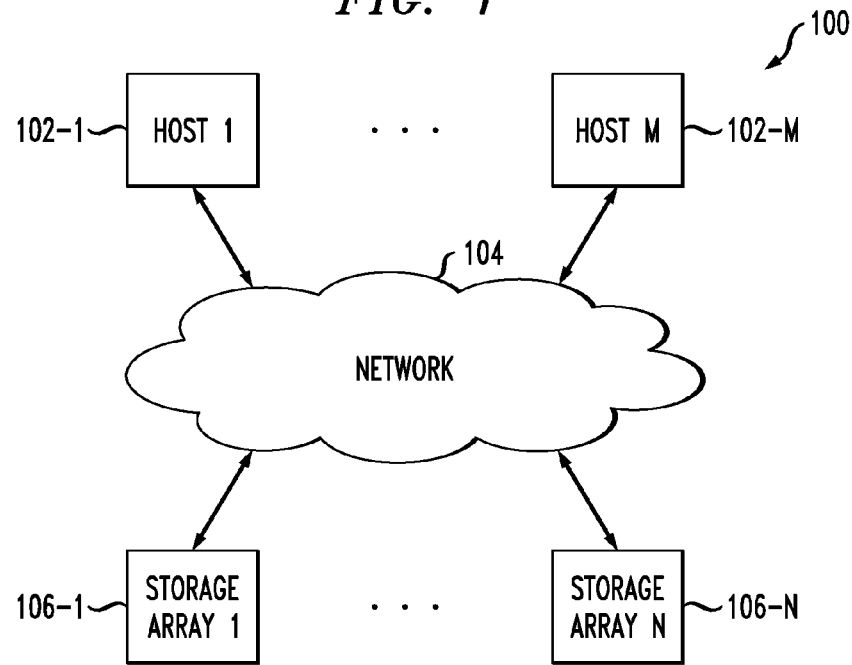
FIG. 1 shows a data memory and storage system environment with host computing devices and storage arrays according to an embodiment of the invention.

FIG. 1 shows a data memory and storage system environment with host computing devices and storage arrays according to an embodiment of the invention. As shown in data memory and storage system environment 100 in FIG. 1, a plurality of host computing devices (hosts) 102-1 through 102-M are operatively coupled to a plurality of storage arrays 106-1 through 106-N via a network 104. Network 104 may be any known communication network or combination of networks including networks using protocols such as, but not limited to, Ethernet, Internet Small Computer System Interface (iSCSI), Fibre Channel (FC), etc. Embodiments of the invention are not limited to any specific communication network or protocol. It is to be understood that while data memory and storage system environment 100 shows multiple hosts and multiple storage arrays, embodiments of the invention are not so limited and, thus, methodologies of the invention can be implemented in environments with less hosts and/or less storage arrays.

Each host 102 is configured to execute an application program, by way of example only, a database application. In general, a host executes the application program using local memory resources and issues read and write requests (commands) to a storage array 106. The storage array, remote from the host, is configured with storage resources used to store backend data files. The storage array processes the read and write commands received from the host and, in the case of a read request, sends data stored thereon back to the requesting host.

A storage array 106 may comprise one or more storage products such as, by way of example, VNX and Symmetrix VMAX, both commercially available from EMC Corporation of Hopkinton, Mass. A variety of other storage products may be utilized to implement at least a portion of a storage array. A host 102 is typically a server (e.g., a Windows server, a Sun Solaris server, an HP server, etc.) upon which the application program executes.

Embodiments of the invention provide for maintaining a memory and storage tier architecture across a data memory and storage system environment, such as the one illustrated in FIG. 1. The tier structure comprises one or more tiers resident on a host computing device and one or more tiers resident on a storage array. As will be further explained, embodiments of the invention enable a user to specify on which of the one or more tiers resident on the host computing device and the one or more tiers resident on the storage array to store data associated with the execution of an application program. Alternatively, or in addition to, a user is enabled to specify a level of service by which the system automatically manages which of the one or more tiers resident on the host computing device and the one or more tiers resident on the storage array to store data associated with the execution of the application program. Similar functionality is given to the user for a memory tier architecture as will also be explained in detail below.

Figure 2:
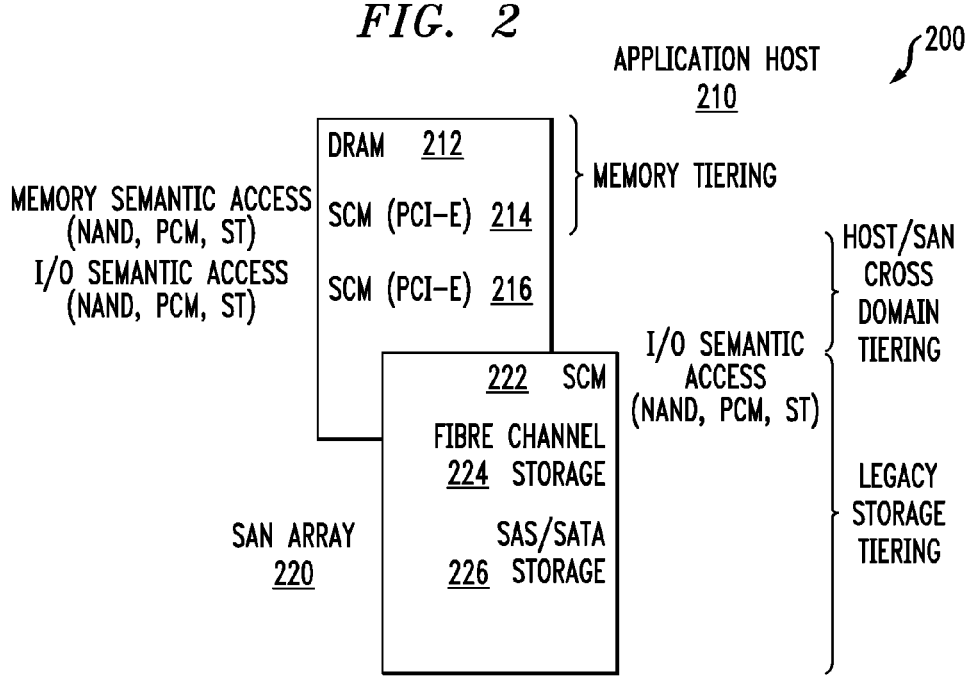
FIG. 2 shows a memory and storage tiering structure according to an embodiment of the invention.

FIG. 2 shows a memory and storage tiering structure according to an embodiment of the invention. As shown, tier structure 200 spans an application host 210 (e.g., host 102) and a storage area network (SAN) array 220 (e.g., storage array 106).

As shown, tiers resident on the application host 210 include a dynamic random access memory tier 212 (DRAM or other form of volatile random access memory), a storage class memory (SCM) tier 214 accessible as a memory resource, and an SCM tier 216 accessible as an input/output (I/O) resource. In one example, the SCM tiers 214 and 216 utilize flash technology (PCI-E) memory devices. However, by way of example only, the SCM can include (alternatively or in addition to) solid state drives (SSDs), next generation non-volatile memory (NVM) drives/cards/dual in-line memory modules (DIMMs), NAND RAM, phase change memory (PCM) RAM, and spin torque (ST) RAM.

As further shown, tiers resident on the SAN array 220 include an SCM tier 222 accessible as an I/O resource, a network (e.g., Fibre Channel) storage tier 224, and serial attached storage (SAS/SATA) tier 226. As with the SCM tier 216 in the host 210, SCM tier 222, in one example, utilizes flash technology (PCI-E) memory devices. However, by way of example only, the SCM can include (alternatively or in addition to) SSDs, next generation NVM drives/cards/ DIMMs, NAND, PCM, and ST RAM.

Advantageously, the tier structure 200 provides for a memory tiering layer (via memory tiers 212 and 214), a host/SAN cross domain tiering layer (via SCM I/O accessible tiers 216 and 222), and a legacy storage tiering layer (via storage tiers 224 and 226).

Tiering is defined as the placement of information on an infrastructure resource commensurate with implementation of a defined policy. Such policies can take factors into account a variety of factors including, but not limited to: information utilization usage statistics (e.g., I/O reads, writes, memory access); customer information values associated with levels of service (e.g., gold, silver, bronze, production, test, sandbox, archive); and any other custom tiering stratification criteria.

Thus, while embodiments of the invention provide an end-to-end (e.g., from DRAM to serial attached storage drives) memory and storage tiering architecture with each tier selectable by a user, the user may also make data placement selections within a tiering layer, i.e., within the memory tiering layer, the host/SAN cross domain tiering layer, and the legacy storage tiering layer.

Figure 3:
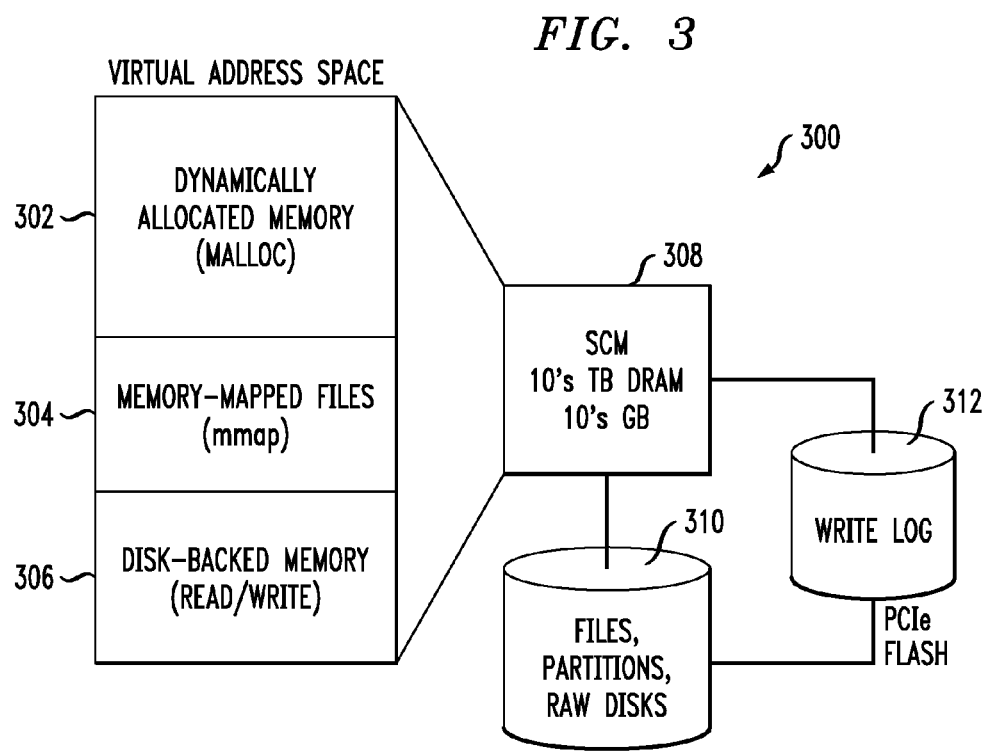
FIG. 3 shows a virtual address space associated with a memory tiering structure according to an embodiment of the invention.

FIG. 3 shows a virtual address space associated with a memory tiering layer according to an embodiment of the invention. Part of the overall tiering technology provided by embodiments of the invention includes the extension of DRAM-backed anonymous memory via utilization of SCM-backed resources. For example, recall the memory tiering layer in FIG. 2 formed via DRAM tier 212 and SCM memory accessible tier 214. In accordance with embodiments of the invention, the SCM tier 214 is exposed to a user (e.g., an application developer) as a tier of memory available for their use that has performance characteristics that are different from DRAM.

Such performance characteristics can be taken into account when deciding what information to place into these extended memory tiers. For example, some characteristics of this extended memory model include, but are not limited to: the SCM is directly accessible as memory; the SCM significantly increases available capacity for all three memory allocation components, i.e., dynamically allocated memory (malloc), memory-mapped (mmap) files, and disk-backed memory; a page fault handler can still move (4 KB) pages in and out from storage for memory-mapped file pages; and a FileIO stack reads in pages for disk-backed memory, with writes being accomplished either synchronously or asynchronously.

Thus, as shown in FIG. 3, memory tier structure 300 comprises a dynamically allocated memory (malloc) 302, memory-mapped (mmap) files 304, and disk-backed memory 306. These memory regions make up the virtual address space of the SCM/DRAM memory 308. It is to be understood that SCM/DRAM 308 comprises DRAM tier 212 and SCM memory accessible tier 214 in FIG. 2. Also shown in FIG. 3 as being operatively coupled to SCM/DRAM 308 are files, partitions and raw disks 310, and write logs 312. In accordance with embodiments of the invention, memory tiering policies are specified via an interface by a user (e.g., application developer/vendor). Furthermore, the user can serve as an agent of data movement between memory tiers in this model.

Accordingly, embodiments of the invention provide methodologies (e.g., on-boarding mechanism to be described in detail below in the context of FIG. 6) for application providers to enable both memory tiering (FIG. 3), and combined memory/storage local/SAN tiering (FIG. 2) for their data. Embodiments of the invention also provide methods for persisting tiered memory and having the tiered memory participate as an administered and protected resource along with other tiered storage assets.

By way of example only, a storage tiering policy can be specified in two ways: (i) by an application partner via the specified on-boarding mechanism, which is particularly advantageous when the control point for information management is at the memory level; and (ii) by a storage administrator using all legacy storage tiering policy and management controls.

Before describing the above-mentioned on-boarding mechanisms, we describe below illustrative use cases (i.e., I/O data model and fully in-memory data model) for the data memory and storage tiering embodiments of the invention.

Figure 4:
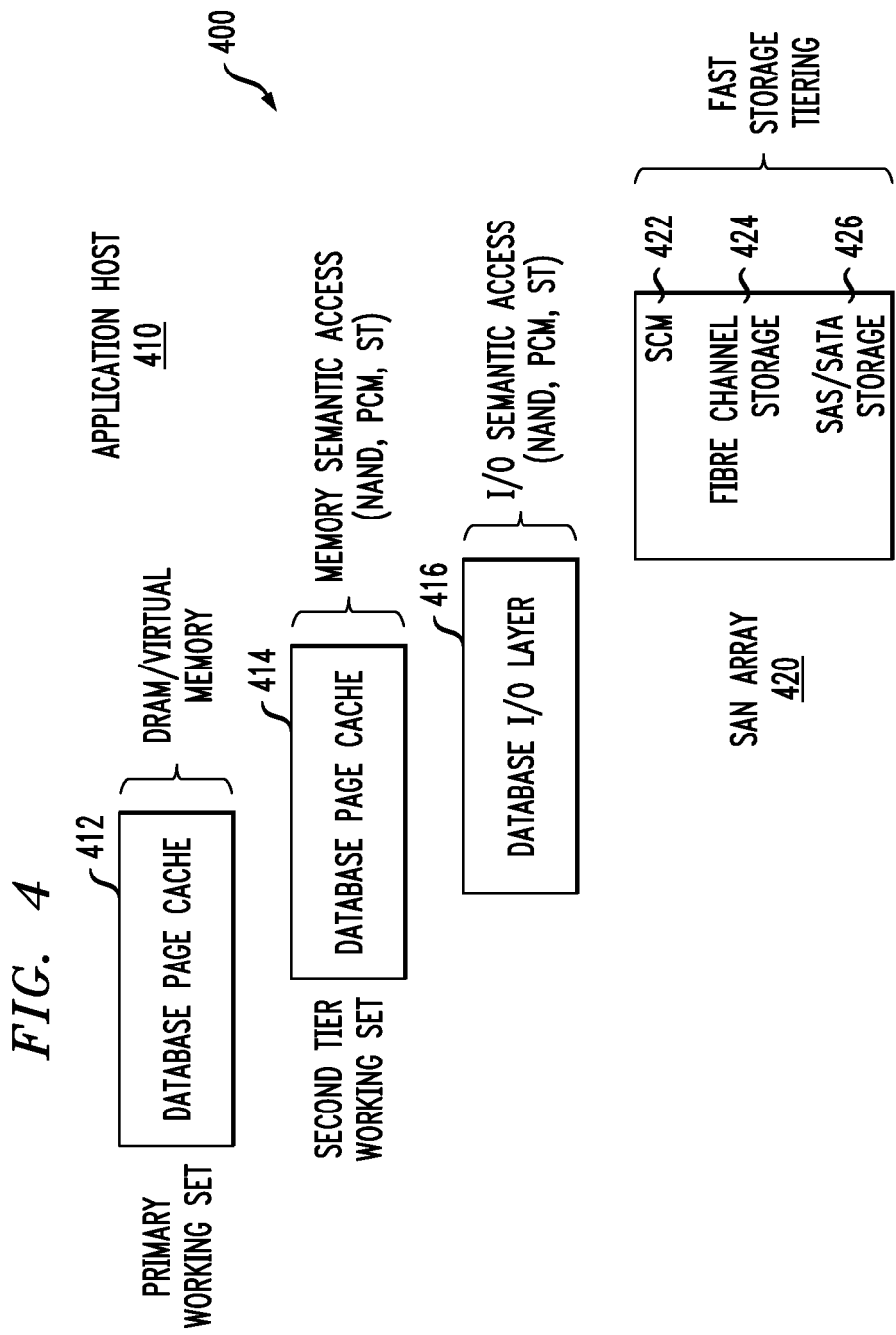
FIG. 4 shows a memory and storage tiering structure for an input/output data model according to an embodiment of the invention.

FIG. 4 shows a memory and storage tiering structure 400 for an input/output data model according to an embodiment of the invention. As shown, application host 410 and SAN array 420 comprise a tier structure including a DRAM/virtual memory tier 412 (corresponding to tier 212 in FIG. 2), an SCM tier 414 accessible as memory (corresponding to tier 214), an SCM tier 416 accessible as I/O (corresponding to tier 216), an SCM tier 422 accessible as I/O (corresponding to SCM tier 222), a Fibre Channel storage tier 424 (corresponding to tier 224), and an SAS/SATA storage tier 426 (corresponding to tier 226).

The historical approach to database applications is to utilize a buffered I/O data model. This is the model employed by most commercial database products currently. The buffered I/O data model assumes that memory, even virtual memory, is a limited resource relative to the amount of data in the working set of the database. In order to accommodate this limitation with a minimum impact to database workload performance, the most recently used database data (in chunks referred to here as pages) is retained and/or prefetched into a cache buffer (412) in the database host(s) virtual memory so that it can be utilized without expensive storage I/O access time. It is to be appreciated that there are many straightforward permutations to this basic buffered I/O data model approach.

It is quite advantageous for systems built on this buffered I/O model to have their entire working sets contained within those buffers. From a response time perspective, I/O is the most expensive operation, so the more that it can be avoided by extensive usage of buffer caches the better. Design inefficiencies exist in some database products where very large caches cannot be effectively utilized, but as a general principal, I/O avoidance is desirable.

Embodiments of the invention allow applications that employ a buffered I/O model to design for tiered buffer caches. This allows them to greatly expand the amount of working set kept in buffer caches. Rather than simply utilizing a single large cache of database pages on the assumption that the access time to all data within a cache will be the same, an architecture is implemented such that rarely accessed, or purposely archived data can be put into a cache with slower access times. This cache (414) is backed by storage class memory with memory mapped files, rather than by traditional DRAM/virtual memory constructs (in 412). This memory tiering capability is particularly useful for applications which are tethered to the buffered I/O architecture, however, benefit from having immediate cached access to data which has aged-out and will only be accessed on important boundary conditions such as monthly batch cycle processing, or has been purposefully archived. Previously, such data could only be access via a completely I/O driven paradigm.

One of the important limitations of the buffered I/O cache model and the full in-memory model, which will be discussed below, is persistence across a reboot of the application host(s). DRAM is volatile asset, meaning that any data that is placed into it is lost upon power failure or other restart events. Repopulation of the application cache is a major operation concern for all application vendors that rely on large DRAM-based caches. This is typically accounted for with a variety of business continuity techniques from page-level cache mirroring, through transaction replication redundancy across hosts. Embodiments of the invention improve significantly on these capabilities by offering the ability to have non-volatile caches. Storage class memory is a non-volatile resource, and when used to construct and utilize memory-mapped files to be consumed as application cache resource, the system now has the ability to have a non-volatile application cache that does not require expensive repopulation after a host outage. The customer may additionally be able to avoid complex and expensive replication schemes that are intended merely as a way to avoid extensive outage time after a failure.

This capability is particularly important when tiered memory and memory caches are used to house archived, aged-out, or rarely used data. A customer is never going to want to hold up the restart of production operations waiting for the repopulation of second tier information. Embodiments of the invention allow them to avoid that wait. It should be noted that this model is not the same as a statistically determined spillover tier (which will be discussed below in the context of FIG. 5). In this model, the customer/partner has determined that information residence in the tier corresponds to a business value that cannot be determined by statistics. For instance, if the data is considered archival, it belongs in the lower performing tier even if for some reason it is experiencing a spike in access. Alternatively, data from "free" customer, as compared with a "paid" customer, may deserve a purposeful application tier distinction rather than a statistics based spillover.

Figure 5:
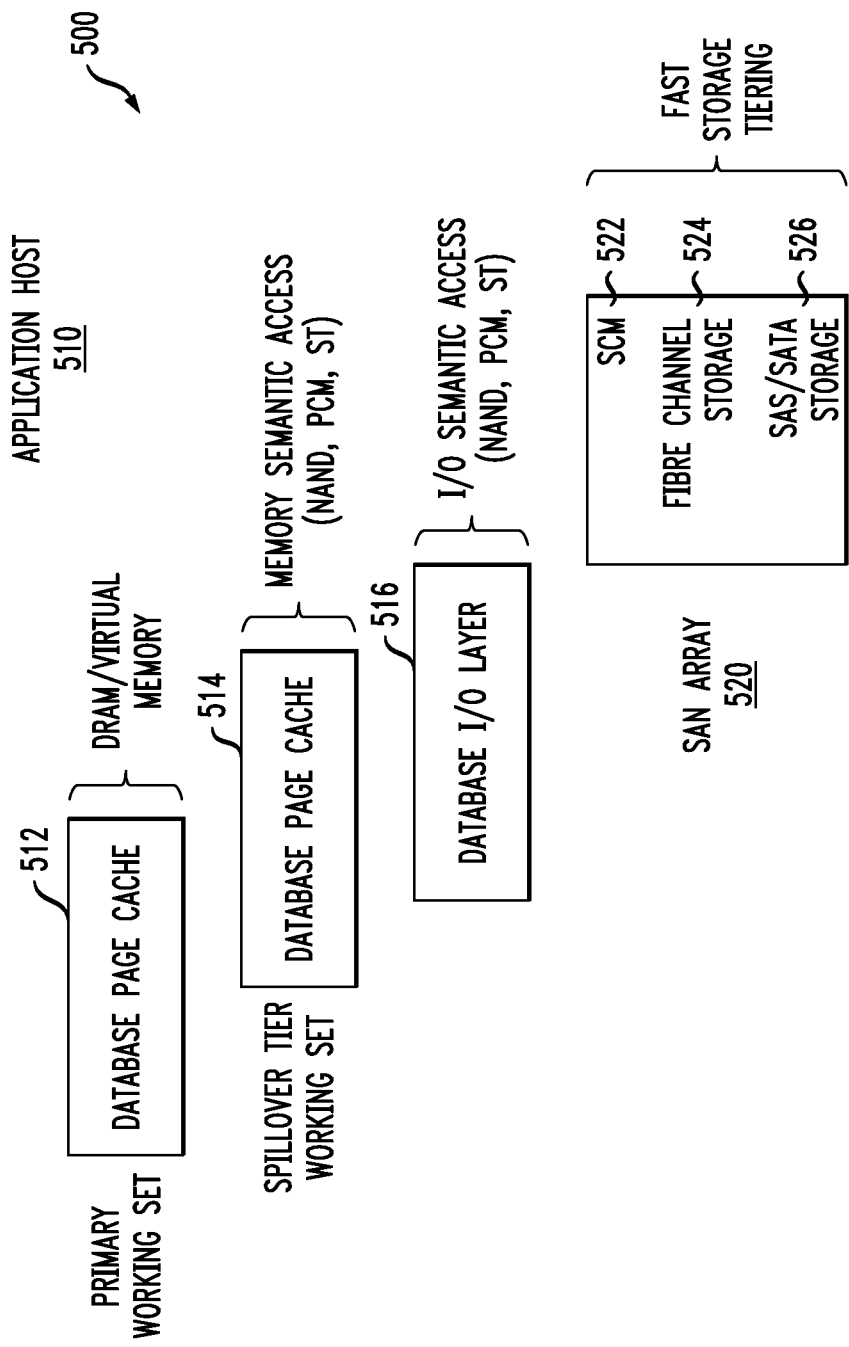
FIG. 5 shows a memory and storage tiering structure for an input/output data model with spillover tier according to an embodiment of the invention.

FIG. 5 shows a memory and storage tiering structure 500 for an input/output data model with spillover tier according to an embodiment of the invention. As shown, application host 510 and SAN array 520 comprise a tier structure including a DRAM/virtual memory tier 512 (corresponding to tier 212 in FIG. 2), an SCM tier 514 accessible as memory (corresponding to tier 214), an SCM tier 516 accessible as I/O (corresponding to tier 216), an SCM tier 522 accessible as I/O (corresponding to SCM tier 222), a Fibre Channel storage tier 524 (corresponding to tier 224), and an SAS/SATA storage tier 526 (corresponding to tier 226).

As mentioned above, there is a spillover use case with respect to the buffered I/O data model. Based on some page aging criteria, the system can evict pages from the primary DRAM-backed page cache (512) and place the pages into an SCM flash-based cache (514) instead. Thus, embodiments of the invention enable a spillover capability that allows an application developer/vendor to take advantage of a persisted, replicated spillover that can be further tiered down into the traditional SAN storage layer (522, 524, and 526).

It is realized that the buffered I/O data model has several disadvantages for scalability. Most importantly, it assumes that I/O is the primary mechanism for retrieval of information. As such, systems that utilize this approach are highly inefficient for processing data in a full in-memory model, even when all data happens to be in the cache buffers and no actual I/O is required. This has been shown many times in experimental lab situations with legacy database products.

For this reason, a class of fully in-memory database products has been developed in the market. A fully in-memory database is one in which, during query operations, there is no facility to fetch data from external storage resources via an I/O mechanism. All data resides in virtual (or physical) memory, and is accessed with a memory semantic, or an error is produced by the database engine. These fully in-memory database engines today may still issue I/O in order to persist transaction changes to durable media. In essence, there is still both a memory model and an I/O model being employed, however, it is expected that the user is never waiting on application-generated I/O for the return of business critical information.

One of the design problems with these fully in-memory systems is scalability. Since the amount of memory that can be resident on a single host has a defined limit, these systems will either live within those limitations, or scale out by adding additional nodes in a clustered configuration. This leads to several problems. The first problem is cost. When adding additional nodes, the customer is adding more than just memory. They are adding all of the other expensive components within the cluster node as well, even though they may not have had a need for that resource or the power and space it consumes. More importantly, these systems today cannot map the value of information to the cost of the resource they are consuming. It must all reside in DRAM memory, which is the most expensive resource available. Even when information is not used, or in an archive-worthy status, it must still reside in memory if it is to be utilized within this database model. The second problem is operational complexity. Adding nodes to existing production systems, and increasing the communication flow between nodes, simply to add data capacity, is an inefficient design.

Embodiments of the invention allow database systems characterized as in-memory to utilize tiers of memory, storage class memory (SCM) accessed as memory mapped files, storage class memory (SCM) accessed as local storage, and the full palette of tiered SAN storage as part of their data access model, see, e.g., the tiering architectures of FIGS. 2 and 3. Database and application engineers are enabled to do this while still coding their systems using a memory based semantic. This allows for the usage of intelligent tiering rather than adding cluster nodes for many types of data expansion needs, including having full access to effectively limitless amounts of archival and aged-out data.

The approach to tiering at the storage layer according to embodiments of the invention has been characterized by: the creation of tiering policies by a storage administrator; and the automated movement of data between storage tiers based upon data collection and intelligent statistical algorithms applied in adherence to the desired policies. However, the approach to tiering at the host application/memory layer is somewhat different. At this layer of the application stack, the application administrator will decide the tiering policies. These may be fundamentally different from the goals, methods and implementation of a storage tiering policy.

For instance, a storage administrator may specify gold, silver, and bronze tiers of storage that correspond to I/O performance and replication attributes. The tiering of memory may more appropriately be set by an application administrator to indicate data attributes such as archive versus active, or other application-aware boundary conditions. But more specifically, the statistics about how data is used in memory within the application context is not directly available to the infrastructure provider. For these reasons, the decisions for placement of information into specific memory tiers lie with application providers.

Figure 6:
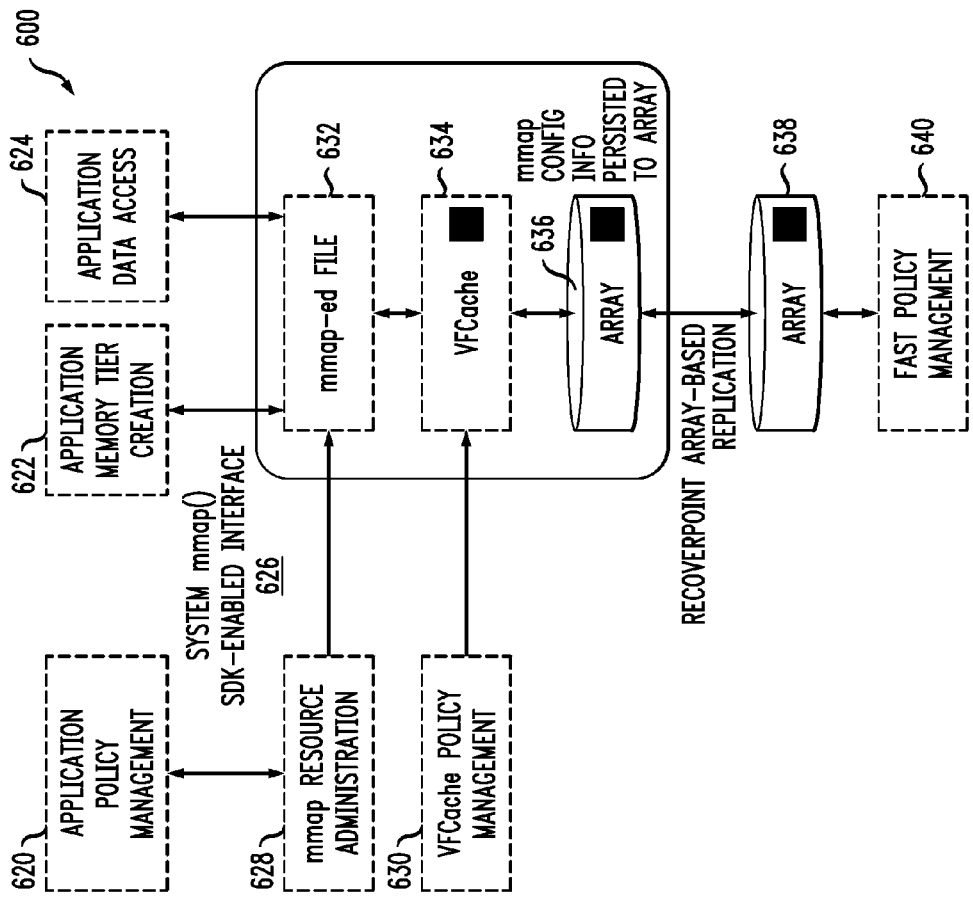
FIG. 6 shows a methodology for providing memory tiering control and functionality according to an embodiment of the invention.

FIG. 6 shows a methodology 600 for providing memory tiering control and functionality according to an embodiment of the invention. That is, FIG. 6 illustrates an on-boarding methodology for tiering at the host application/memory layer (e.g., tiers 212 and 214 in FIG. 2). In conjunction with the steps of the on-boarding methodology 600, FIG. 6 illustrates components of the system (tiering architecture controlled by infrastructure provider) that are engaged during the on-boarding methodology. More specifically, as shown, the system includes a module 620 for application policy management, a module 622 for application memory tier creation, a module 624 for application data access, a memory mapped software development kit (SDK) enabled interface 626, a module 628 for memory mapped resource administration, a VFCache policy management module 630, memory mapped files 632, VFCache 634, array 636 (for persisting memory mapped configuration information), array 638 (for array-based replication), and a fully automated storage tiering (FAST) policy management module 640. It is to be appreciated that VFCache and its associated policies and FAST and its associated policies are technologies and/or products commercially available from EMC Corporation of Hopkinton, Mass. However, embodiments of the invention are not limited to these specific cache or storage technologies.

In step 602, the application vendor exposes memory tiering policies to customers based on their needs and design. By the term "expose" as used herein, it is meant to enable or make available for selection.

In step 604, the system exposes available choices and options for memory mapped files via one or more SDK-enabled interfaces (626).

In step 606, the system exposes available optional choices for further tiering into the local and SAN storage layers.

In step 608, the system exposes available optional choices for replication of persisted memory resources.

In step 610, selections are externalized and persisted in a configuration area. In one embodiment, the configuration area is a persistent data store output from module 620, and is created by the application vendor.

In step 612, the application vendor issues an SDK-enabled interface that performs mmap( ) functions for selected memory mapped files (632).

In step 614, the application uses these memory mapped regions.

In step 616, based upon options selected, replication of memory mapped files (632), VFCache (630), and the FAST (640) subsystem are engaged when data is persisted.

Embodiments of the invention also provides for the creation of other SDK tools that make it easier for application developers/vendors to utilize SCM-backed memory. For instance, in accordance with embodiments of the invention, SDK tools are configured to safely ease the movement of information from traditional DRAM memory locations to SCM-backed memory locations.

Figure 7:
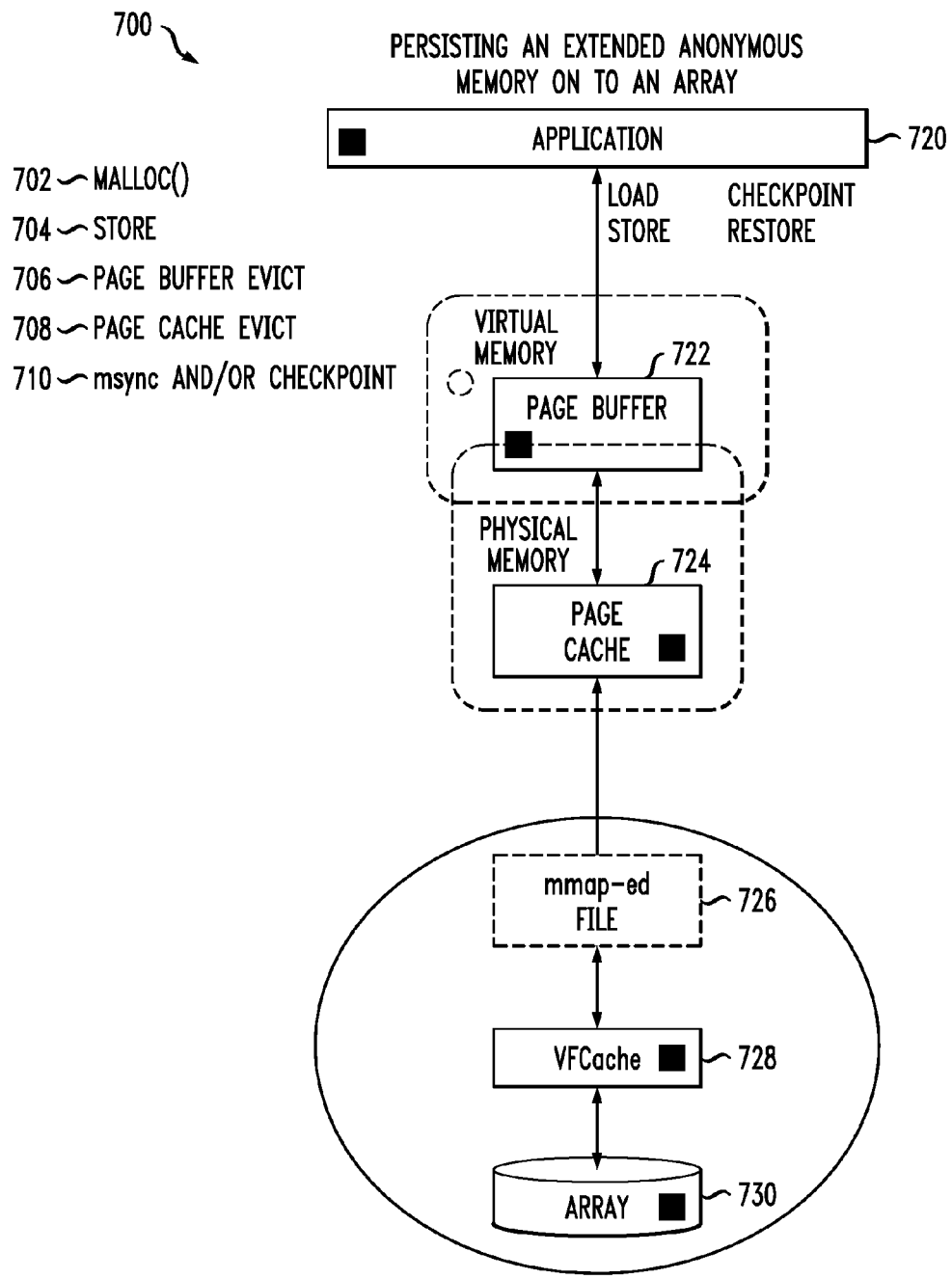
FIG. 7 shows a methodology for persisting extended anonymous memory to a storage array according to an embodiment of the invention.

We now turn to a description of embodiments of the invention for persisting anonymous memory to multiple tiers of storage. FIG. 7 shows a methodology 700 for persisting extended anonymous memory to a storage array according to an embodiment of the invention. The methodology 700 will be described in the context of a system including an application 720, a page buffer (virtual memory) 722, a page cache (physical memory) 724, memory mapped files 726, VFCache 728, and array 730.

As shown, in order to persist anonymous memory to permanent storage, the following operating system processes are employed on the memory mapped files that are in use.

Step 702: malloc( )—this step allocates a number of bytes and returns a pointer to the allocated memory. This steps allocates a new amount of memory in the memory mapped file.

Step 704: store—load and store operations refer to how data in memory is made accessible for processing by a central processing unit (CPU). The store operation copies the values from a CPU's store data pipeline (or analogous architecture) to memory. Each CPU architecture has a different memory subsystem. The store operation is specified here to indicate this as part of the path for persisting anonymous memory out to the array.

Step 706: Page buffer evict—this step evicts a buffer of data out of virtual memory.

Step 708: Page cache evict—this step then evicts a page out of the physical page cache.

Step 710: msync and/or checkpoint—this step flushes all changes made to the memory mapped files (632) out to the VFCache (634) and thus to the underlying array (636).

Once employed, the above methodology guarantees that changes made in memory to these structures will be persisted to the local storage under control of the host operating system. Furthermore, if the files are being serviced by a VFCache filter driver configuration, this data can/will also be persisted to other external arrays and device types, for example, pursuant to the designs of VFCache and FAST policies, as well as direct attached storage (DAS) policies.

Figure 8:
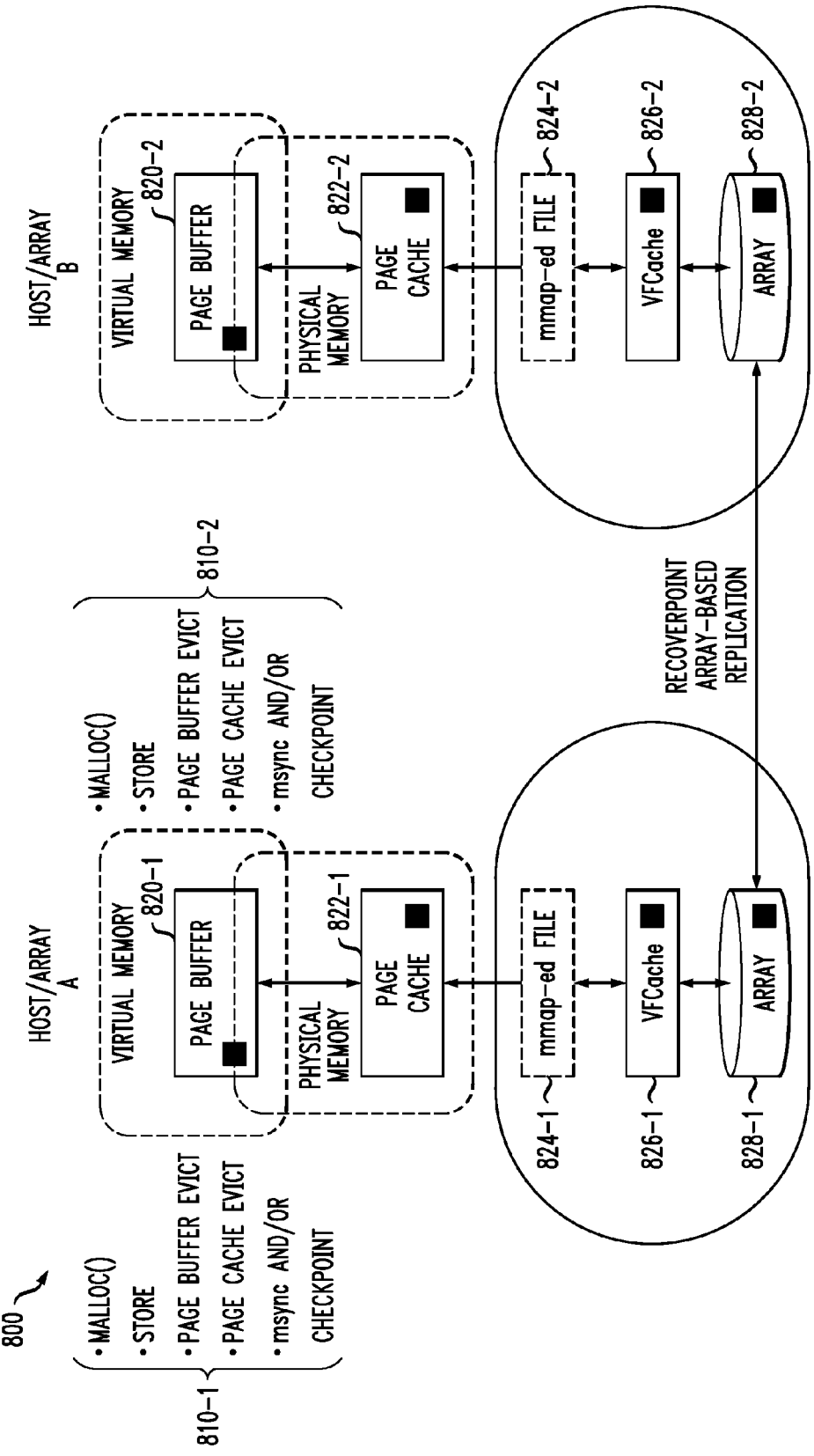
FIG. 8 shows a methodology for remote replication of memory images according to an embodiment of the invention.

We now turn to a description of embodiments of the invention for remote replication/restore of memory images. FIG. 8 shows a methodology 800 for remote replication of memory images according to an embodiment of the invention. The methodology 800 will be described in the context of a system including page buffers (virtual memory) 820-1 and 820-2, page caches (physical memory) 822-1 and 822-2, memory mapped files 824-1 and 824-2, VFCaches 826-1 and 826-2, and arrays 828-1 and 828-2. Note that the -1 and -2 after each reference numeral identify either host/array set A (-1) or host/array set B (-2).

Since memory images are persisted as described above, they are eligible to be replicated by a replication product such as, by way of example only, Recoverpoint or Symmetrix Remote Data Facility, both commercially available from EMC Corporation of Hopkinton, Mass. As further described above, during the on-boarding process, replication options for persisted memory images can be chosen. The implementation of these options is transparent to the user via a programmatic interface with the underlying replication technology (Recoverpoint, SRDF, etc.). Recovery options can either be exposed through an on-boarding interface as well or through existing product recovery interfaces or both. FIG. 8 depicts a bi-directional replication of memory images, where each array contains the replicated image(s) generated from remote hosts.

As shown, a memory image is replicated from host/array set A to host/array set B (or vice versa). It is assumed that a given memory image is persisted to permanent storage using steps similar to those described above in FIG. 7. Thus, reference numerals 810-1 and 810-2 represent the same or similar steps as described above for reference numerals 702 through 710.

Figure 9:
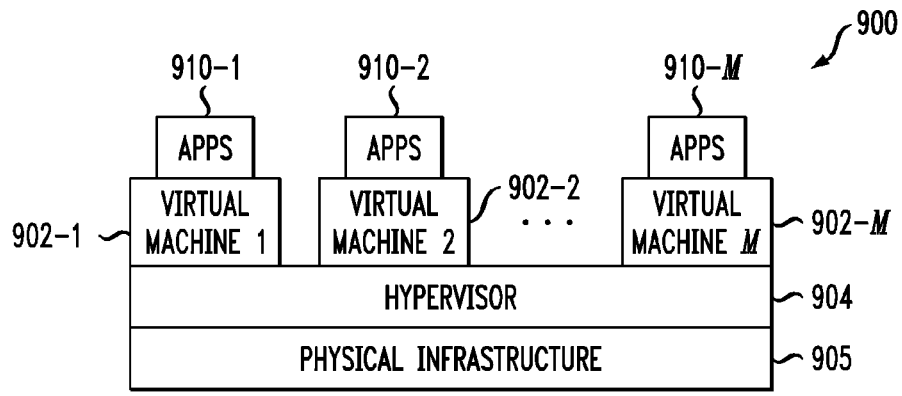
FIGS. 9 and 10 show examples of processing platforms utilized to implement a data memory and storage system environment according to an embodiment of the invention.

It is to be appreciated that the various components and steps illustrated and described in FIGS. 1 through 8 can be implemented in a distributed virtual infrastructure or cloud infrastructure. FIG. 9 illustrates a cloud infrastructure 900. The data memory and storage environment 100 of FIG. 1 can be implemented, in whole or in part, by the cloud infrastructure 900.

As shown, the cloud infrastructure 900 comprises virtual machines (VMs) 902-1, 902-2, . . . , 902-M implemented using a hypervisor 904. The hypervisor 904 runs on physical infrastructure 905. The cloud infrastructure 900 further comprises sets of applications 910-1, 910-2, . . . , 910-M running on respective ones of the virtual machines 902-1, 902-2, . . . , 902-M (utilizing associated logical storage units or LUNs) under the control of the hypervisor 904.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Although only a single hypervisor 904 is shown in the example of FIG. 9, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 904 which, as shown in FIG. 9, is directly inserted on top of the computer hardware in order to allocate hardware resources of the physical computer (physical infrastructure 905) dynamically and transparently. The hypervisor 904 affords the ability for multiple operating systems to run concurrently on a single physical computer and share hardware resources with each other.

An example of a commercially available hypervisor platform that may be used to implement portions of the cloud infrastructure 900 in one or more embodiments of the invention is vSphere which may have an associated virtual infrastructure management system such as vCenter, both commercially available from VMware Inc. of Palo Alto, Calif. The underlying physical infrastructure 905 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 900.

Figure 10:
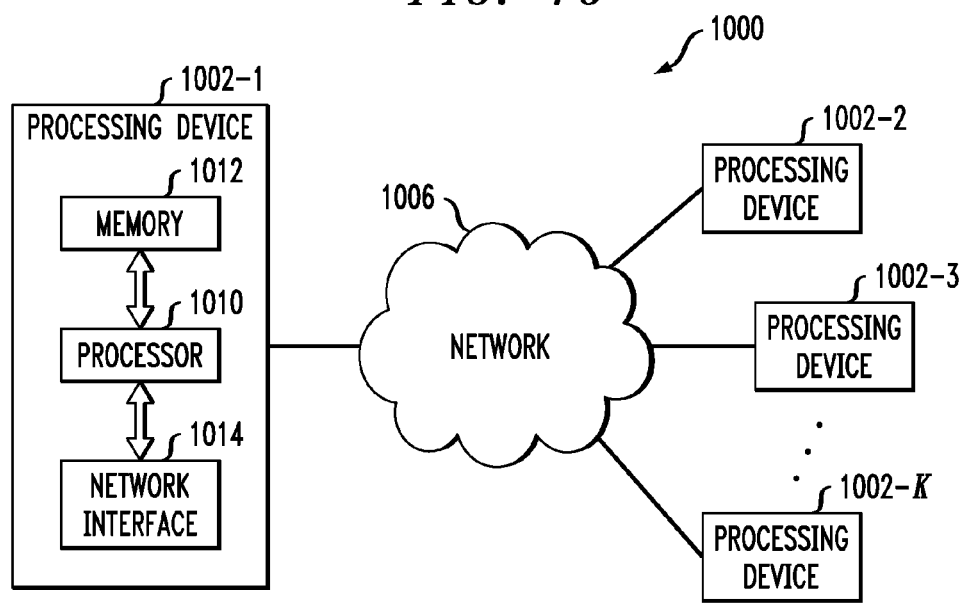

An example of a processing platform on which the cloud infrastructure 900 may be implemented is processing platform 1000 shown in FIG. 10. The processing platform 1000 in this embodiment comprises a plurality of processing devices denoted 1002-1, 1002-2, 1002-3, . . . , 1002-K which communicate with one another over a network 1006. One or more of the components shown and described in FIGS. 1 through 8 may therefore each run on one or more storage arrays, one or more hosts, servers, computers or other processing platform elements, each of which may be viewed as an example of what is more generally referred to herein as a "processing device." As illustrated in FIG. 10, such a device generally comprises at least one processor and an associated memory, and implements one or more functional modules for controlling certain features of components shown in FIGS. 1 through 8. Again, multiple elements or modules may be implemented by a single processing device in a given embodiment.

The processing device 1002-1 in the processing platform 1000 comprises a processor 1010 coupled to a memory 1012. The processor 1010 may comprise a microprocessor, a microcontroller, an application-specific integrated circuit (ASIC), a field programmable gate array (FPGA) or other type of processing circuitry, as well as portions or combinations of such circuitry elements. The memory 1012, specifically shown in FIG. 10, may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the processing device 1002-1 causes the device to perform functions associated with one or more of the components shown in FIGS. 1 through 8. One skilled in the art would be readily able to implement such software given the teachings provided herein. Other examples of computer program products embodying embodiments of the invention may include, for example, optical or magnetic disks.

Also included in the processing device 1002-1 is network interface circuitry 1014, which is used to interface the processing device with the network 1006 and other system components. Such circuitry may comprise conventional transceivers of a type well known in the art.

The other processing devices 1002 of the processing platform 1000 are assumed to be configured in a manner similar to that shown for processing device 1002-1 in the figure.

The processing platform 1000 shown in FIG. 10 may comprise additional known components such as batch processing systems, parallel processing systems, physical machines, virtual machines, virtual switches, storage volumes, logical units, etc. Again, the particular processing platform shown in FIG. 10 is presented by way of example only, and components and steps shown and described in FIGS. 1 through 8 may include additional or alternative processing platforms, as well as numerous distinct processing platforms in any combination.

Also, numerous other arrangements of servers, computers, storage devices or other components are possible for implementing components shown and described in FIGS. 1 through 8. Such components can communicate with other components over any type of network, such as a wide area network (WAN), a local area network (LAN), a satellite network, a telephone or cable network, a storage network (e.g., Fibre Channel, iSCSI, Ethernet), a converged network (e.g., FCoE or Infiniband) or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for managing storage of data in a data memory and storage system environment comprising at least one host computing device and at least one storage array, comprising steps of:

maintaining a memory and storage tier architecture across the data memory and storage system environment comprising one or more tiers resident on the host computing device and one or more tiers resident on the storage array; and enabling a user to at least one of: (i) specify on which of the one or more tiers resident on the host computing device and the one or more tiers resident on the storage array to store data associated with the execution of an application program; and (ii) specify a level of service by which the system automatically manages which of the one or more tiers resident on the host computing device and the one or more tiers resident on the storage array to store data associated with the execution of the application program.

2. The method of claim 1, further comprising the step of moving at least a portion of data stored at one of the tiers, as initially specified by the user or directed by the system, to another one of the tiers based on at least one usage criterion.

3. The method of claim 1, wherein the one or more tiers resident on the host computing device comprise one or more of: a volatile random access memory resource tier; a non-volatile storage class memory resource tier accessible as a memory resource; and a non-volatile storage class memory resource tier accessible as an input/output resource.

4. The method of claim 3, wherein the volatile random access memory resource comprises one or more dynamic random access memory devices.

5. The method of claim 3, wherein at least one of the non-volatile storage class memory resource accessible as a memory resource and the non-volatile storage class memory resource accessible as an input/output resource comprises one or more non-volatile memory devices.

6. The method of claim 1, wherein the one or more tiers resident on the storage array comprise one or more of: a non-volatile storage class memory resource tier accessible as an input/output resource; a network disk drive resource tier; and a serial attached disk drive resource tier.

7. The method of claim 6, wherein the non-volatile storage class memory resource accessible as an input/output resource comprises one or more non-volatile memory devices.

8. The method of claim 1, wherein the user enabling step further comprises providing the user access to control storage of data across the memory and storage tier architecture by selecting one or more of the tiers to function as dynamically allocated memory for use by the application program.

9. The method of claim 1, wherein the user enabling step further comprises providing the user access to control storage of data across the memory and storage tier architecture by selecting one or more of the tiers to function as memory-mapped file memory for use by the application program.

10. The method of claim 1, wherein the user enabling step further comprises providing the user access to control storage of data across the memory and storage tier architecture by replicating data within persisted memory resources in one or more of the tiers.

11. The method of claim 1, wherein the memory and storage tier architecture is maintained in accordance with an input/output data model.

12. The method of claim 11, wherein the input/output data model comprises a spillover tier.

13. The method of claim 1, wherein the memory and storage tier architecture is maintained in accordance with a fully in-memory data model.

14. A computer program product comprising a processor-readable storage medium having encoded therein executable code of one or more software programs, wherein the one or more software programs when executed by a processor implement the steps of the method of claim 1.

15. A method for managing storage of data in a host computing device, comprising steps of:
maintaining a memory tier architecture comprising one or more memory tiers resident on the host computing device; and
enabling a user to at least one of: (i) specify on which of the one or more memory tiers resident on the host computing device to store data associated with the execution of an application program; and (ii) specify a level of service by which the device automatically manages which of the one or more memory tiers resident on the host computing device to store data associated with the execution of the application program.

16. The method of claim 15, wherein the one or more memory tiers resident on the host computing device comprise a volatile random access memory resource tier and a non-volatile storage class memory resource tier accessible as a memory resource.

17. The method of claim 16, wherein the volatile random access memory resource comprises one or more dynamic random access memory devices and wherein the non-volatile storage class memory resource accessible as a memory resource comprises one or more non-volatile memory devices.

18. A computer program product comprising a processor-readable storage medium having encoded therein executable code of one or more software programs, wherein the one or more software programs when executed by a processor implement the steps of the method of claim 15.

19. A system for managing storage of data, comprising:
a memory and storage tier structure defined by one or more tiers resident on a host computing device and one or more tiers resident on a storage array; and
a processor configured to enable a user to at least one of: (i) specify on which of the one or more tiers resident on the host computing device and the one or more tiers resident on the storage array to store data associated with the execution of an application program; and (ii) specify a level of service by which the system automatically manages which of the one or more tiers resident on the host computing device and the one or more tiers resident on the storage array to store data associated with the execution of the application program.

20. A system for managing storage of data, comprising:
a memory tier structure defined by one or more memory tiers resident on a host computing device; and
a processor configured to enable a user to at least one of: (i) specify on which of the one or more memory tiers resident on the host computing device to store data associated with the execution of an application program; and (ii) specify a level of service by which the device automatically manages which of the one or more memory tiers resident on the host computing device to store data associated with the execution of the application program.

* * * * *